United States Patent [19]

Stange et al.

[11] 4,055,340
[45] Oct. 25, 1977

[54] ASSISTED PNEUMATIC TRANSPORT AND REGISTRATION APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 636,334

[22] Filed: Nov. 28, 1975

[51] Int. Cl.² .......................................... B65H 29/24
[52] U.S. Cl. .................................... 271/236; 271/195
[58] Field of Search ............... 271/231, 235, 236, 238, 271/243, 244, 245, 194, 195, 264; 226/97, 7, 91, 92

[56] References Cited

U.S. PATENT DOCUMENTS

| 3,367,035 | 2/1968 | Tomlinson | 226/97 X |
| 3,405,977 | 10/1968 | Albright | 271/195 X |
| 3,624,807 | 11/1971 | Schwebel | 271/236 |
| 3,653,568 | 4/1972 | Cronquist | 271/195 X |
| 3,707,254 | 12/1972 | Scott | 226/97 |
| 3,727,912 | 4/1973 | Vos | 271/195 |
| 3,834,799 | 9/1974 | Blosser | 271/195 |
| 3,926,426 | 12/1975 | Toriumi | 271/236 X |

Primary Examiner—Richard A. Schacher

Attorney, Agent, or Firm—Carlos Nieves; James J. Ralabate

[57] ABSTRACT

In a first embodiment, a stop having a plurality of ports is connected to and covers an end of a bent rectangular sleeve. In a region near the stop, a narrow wall of the sleeve also has a plurality of ports. The sleeve includes at each bend a pair of oppositely disposed openings, a driven roller, a drive roller cooperating with the driven roller to provide a nip in the sleeve, and a pair of shrouds covering the rollers and openings. A nozzle coupled to a pump provides a flow of air into the other end of the sleeve and the air exits through the ports. With this arrangement, a rectangular sheet inserted into said other end of the sleeve is fluidly brought into registration with the narrow wall and stop, the rollers assisting movement of the sheets through the bends. In a second embodiment, similar to the first, the narrow wall and stop include internal projections against which an inserted sheet is registered. In a third embodiment, similar to the first, a manifold is coupled to the ports and a vacuum pump is coupled to the manifold to accelerate registration. In a fourth embodiment, similar to the third, the pumps are replaced with a reversible pump to register and discharge a sheet.

14 Claims, 7 Drawing Figures

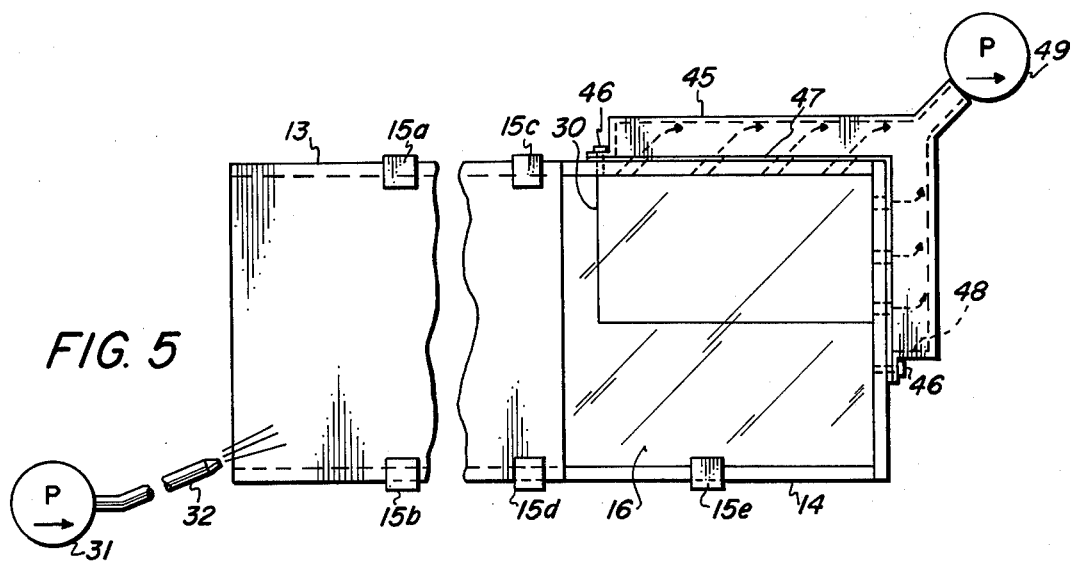
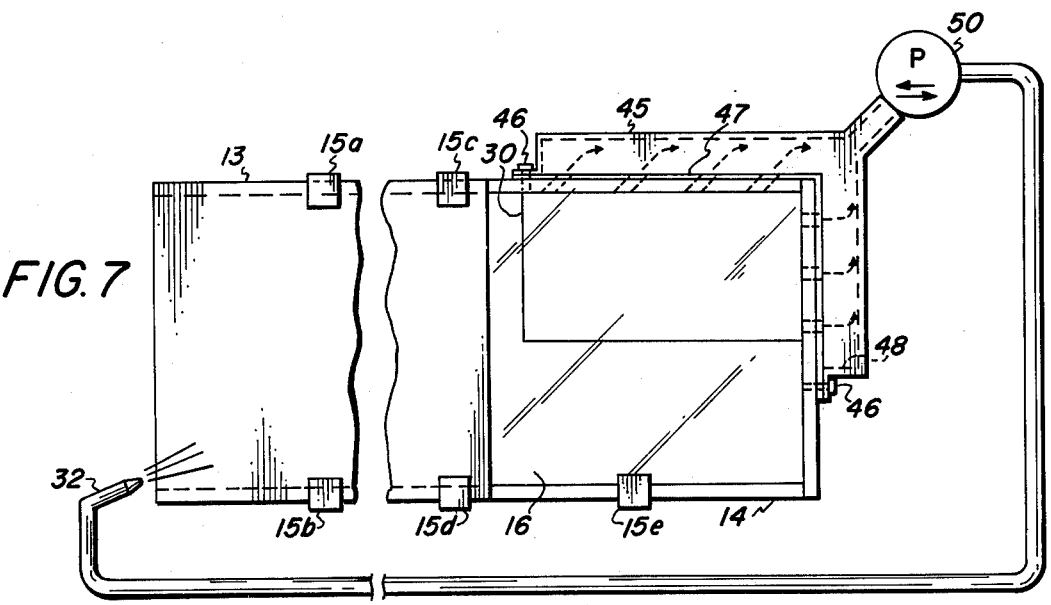

ASSISTED PNEUMATIC TRANSPORT AND REGISTRATION APPARATUS

The subject invention generally relates to pneumatic transports and, in particular, to transports used to register articles carried thereby, such as disclosed in co-pending U.S. Pat. application Ser. No. 627,571, Pneumatic Registration Apparatus, filed on Oct. 31, 1975, on an invention by Klaus K. Stange; and co-pending U.S. Pat. application Ser. No. 627,570, A Registration Station, filed on Oct. 31, 1975, on an invention by Klaus K. Stange, et al, both applications being assigned to the assignee herein, Xerox Corporation.

The use of fluid to move articles into registration with stops is a part of the public prior art which is relevant herein. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduit or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a data storage card. Air pressure and vacuum pressure are switched between opposite ends of the chamber to reciprocally move the card rectilinearly in the chamber. U.S. Pat. No. 3,421,798, issued to C. B. Albright on Jan. 14, 1969, states that prior art sheet handling devices have included rollers for driving sheets along a curved path.

It is noted that with the apparatus disclosed by Leigh D. Leiter, as fabric is advanced or when fabric which is smaller than the distance between nozzles is to be registered, some of the nozzles discharge into the surrounding air without having any effect on the fabric as it is moved into registration. Thus, pressurized air is wasted. In addition, it is noted that in the system disclosed by J. E. Smith, Jr., lateral registration is provided by the distance between walls of the chamber which are parallel to the direction of travel of the storage card. Thus, the system cannot be used with cards having different width dimensions. Further, it is noted that while the use of rollers to drive sheets through curved paths is known, how such rollers can be used with thin chambers, such as disclosed by J. E. Smith, Jr., is not apparent.

It is an object of the present invention to provide apparatus for transporting a sheet through a curved path and registering the sheet with respect to perpendicularly related axes, the sheet having any one of a range of sizes.

It is another object of the present invention to provide apparatus for efficiently moving a sheet through at least one curved path and into registration with perpendicularly related axes, the sheet having a high beam strength.

Briefly, the invention disclosed herein may be used for transporting a sheet through at least one curved path and for registering a sheet with respect to perpendicularly related axes, so long as the sheet has length and width dimensions within predetermined ranges. Structurally, the invention may be implemented with (a) a sleeve for internally accommodating said sheet, the sleeve extending along a curved path, at least one point on an inner narrow wall of the sleeve being aligned in parallel with one of the axes; (b) a stop located at one end of the sleeve, the stop having at least one point aligned in parallel with the other of the axes; (c) means for guiding the sheet past corners of said at least one curved path; and (d) means for providing in the sleeve a fluid stream having velocity components normal to each of the axes, whereby when a sheet is placed in the sleeve, the stream moves the sheet into said means (c) and into abutment with each of said points.

Apparatus built according to the invention may be used to register flimsy sheets, such as thin paper, or sheets having high beam strengths. Advantageously, loose particles undesirably located on either side of the sheets are removed from the sheets during transportation.

Additional objects and features of the invention will become apparent by reference to the following description in conjunction with the accompanying drawings, in which:

FIG. 5 is a partial top plan view of still another embodiment of registration apparatus, according to the invention, a sheet being shown therein in a registered position;

FIG. 7 is a partial top plan view of yet another embodiment of registration apparatus, according to the invention, a sheet being shown therein a registered position.

Figure 1:
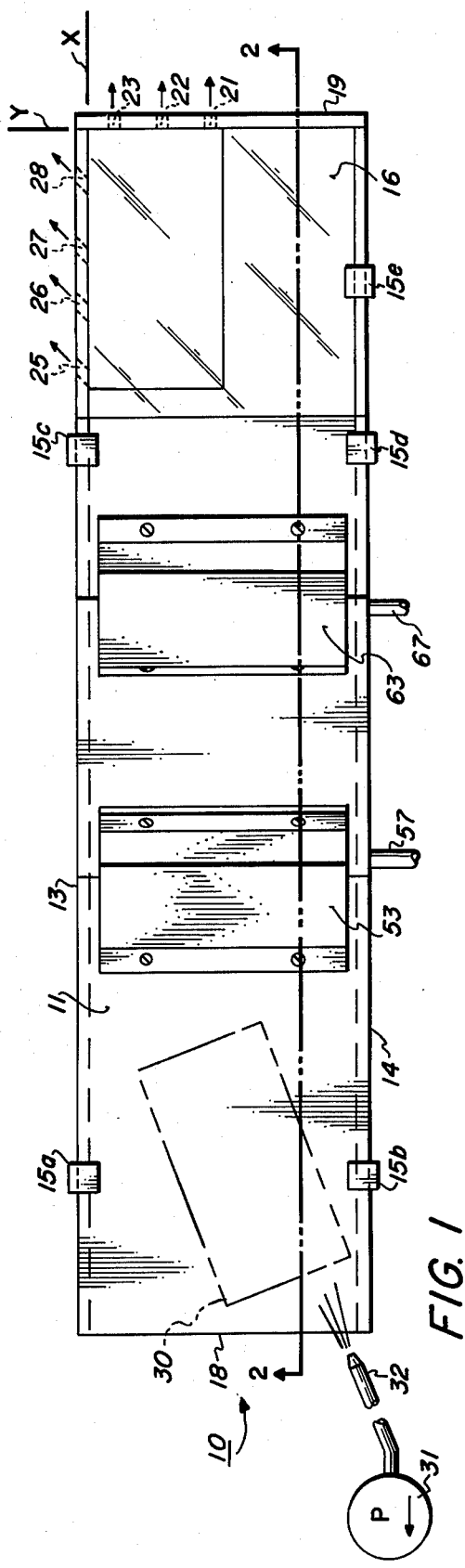
FIG. 1 is a top plan view of registration apparatus, according to the invention, a sheet being shown therein an unregistered position (dotted lines) and in a registered position.
Figure 2:
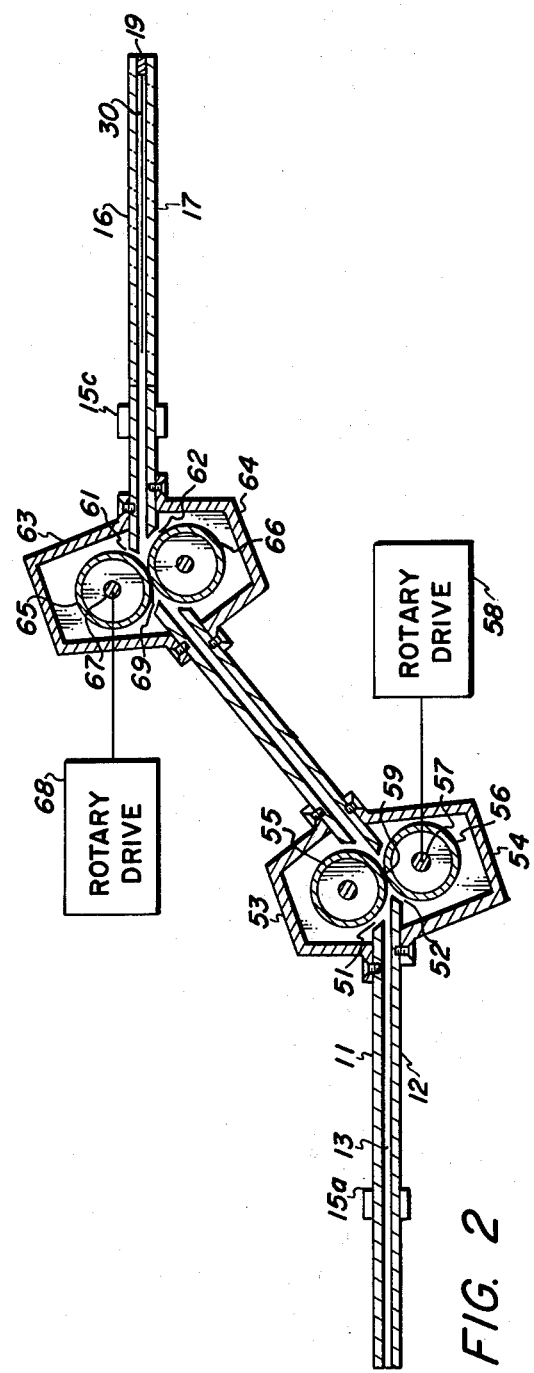
FIG. 2 is a cross-sectional view of the registration apparatus, taken along line 2—2 in FIG. 1.

Registration apparatus 10, according to the invention, is shown in FIGS. 1 and 2. Typically, the apparatus includes a pair of structurally identical curved rectangular plates 11 and 12, a pair of transparent plates 16 and 17 in abutment, respectively, with plates 11 and 12, a pair of curved elongated members of rectangular cross-section 13 and 14 disposed between the plates along longitudinally extending edges, and clamps 15a–15e for holding the plates and elongated members together to form a curved rectangular sleeve having a transparent station. The plates are vertically aligned, and the elongated members are coterminous with the plates at one end 18 and at the other end provide a pair of recesses into which a stop 19 is inserted and secured. The stop 19 includes a plurality of ports 21–23 communicating with the space in the sleeve. Elongated member 13 also includes a plurality of ports 25–28 communicating with the space in the sleeve, the ports in the stop and sleeve being located adjacent a common corner. The sleeve is, in this example, bent in two places. At the corner of one of the bends plates 11 and 12 include openings 51 and 52 exteriorly covered with shrouds 53 and 54, respectively. Shroud 53 is fixed to plate 11 and rotatably supports a roller 55 extending through opening 51, shroud 54 is fixed to plate 12 and rotatably supports a roller 56 extending through opening 52 to form a nip 59 in the sleeve with roller 55, and a shaft 57 couples roller 56 to a drive 58. At the corner of the other bend plates 11 and 12 include openings 61 and 62 exteriorly covered with shrouds 63 and 64, respectively. Shroud 63 is fixed to plate 11 and rotatably supports a roller 65 extending through opening 61, shroud 64 is fixed to plate 12 and rotatably supports a roller 66 extending through opening 62 to form a nip 69 in the sleeve with roller 65, and a shaft 67 couples roller 65 to drive 68. The plates, the shrouds, the elongated members, and the stop are assembled in a fluid tight manner, such that fluid entering through the open end of the sleeve moves towards the common corner and exits through the ports. The stop is perpendicularly disposed with regard to the elongated members and, therefore, the common corner may be aligned with X and Y axes. The top and bottom walls of the sleeve are spaced from each other by approximately one-sixteenth of an inch, and a sheet of paper 30 which is smaller than the length and width of the space in the sleeve may be inserted therein as is indicated by the dotted lines. If, thereafter, a pump 31 and nozzle 32 direct fluid into the open end of the sleeve, the fluid flow through the sleeve will move the sheet into engagement with nip 59, and nip 59 will assist movement of the sheet around the first bend. When the sheet is discharged by nip 59, the fluid moves the sheet into engagement with nip 69, and this nip moves the sheet around the second bend. Thereafter, the fluid will move the sheet into registration at the common corner. In moving a sheet through nips 59 and 61, it is desirable that the peripheral speed of rollers 56 and 65 be equal to the speed with which the fluid moves the sheet. However, this equality is not essential to the operability of the system because of the nature of the fluidic forces exerted on the sheet. It will be appreciated that rollers are used to assist movement of a sheet through the sleeve because sheets having a high beam strength could otherwise get stuck in curved portions of the sleeve. Shrouds 53, 54, 63, and 64 are provided to eliminate an outward flow of fluid which would tend to drive a sheet against a plate 11 or 12 of the sleeve. Preferably, the space between shrouds and corresponding rollers is minimized since the space functions as an expansion chamber which slows down fluid flow when the pump 31 is initially turned on. To move a sheet out of registration, the pump 31 may be turned off, the direction of rotation of rollers 56 and 65 may be reversed, and a fluid stream may be injected into the sleeve through one or more of the ports in the stop 19. In this embodiment of the invention, the top and bottom plates 16 and 17 are manufactured from glass. As a result, sheets brought into registration may be read, may be photographed, or may be scanned with equipment through either of the plates. Obviously, plates 11 and 16 as well as plates 12 and 17 could be manufactured as a unitary transport plastic structure.

The registration apparatus disclosed above may be modified or supplemented in a number of ways, some of which are set forth below. In describing the various embodiments similar reference numerals will be used to designate components previously described.

Figure 3:
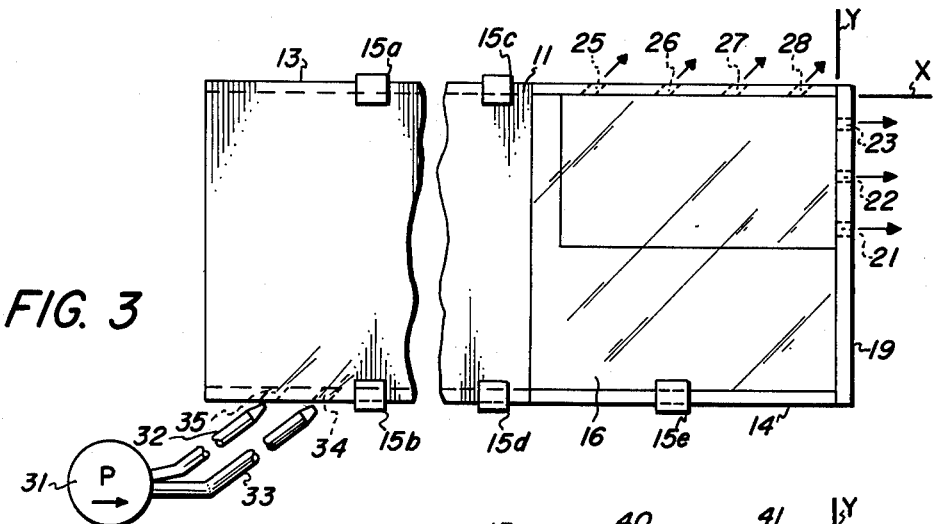
FIG. 3 is a partial top plan view of another embodiment of registration apparatus, according to the invention, a sheet being shown therein in a registered position.

Referring to FIGS. 1 and 3, it may be seen that the registration apparatus shown in FIG. 3 differs from that shown in FIG. 1 only in that ports 34 and 35 communicating with the sleeve are located on the elongated member 14 in an area adjacent the open end of the sleeve and that an additional nozzle 33 has been coupled to the pump. The nozzles are used to inject fluid through the ports in the elongated member for moving a sheet 30 inserted into the sleeve into a registered position. Although not shown, it will be appreciated by those skilled in the art that the nozzles may be replaced by a manifold coupling the pump to ports in elongated member 14. Further, a removable cover for closing the open end 18 after a sheet has been inserted may be provided to increase the speed with which a sheet is moved into registration. Primarily, this embodiment has been disclosed to make it clear that fluid for registering a sheet located in the sleeve need not be supplied through the open end of the sleeve.

Figure 4:
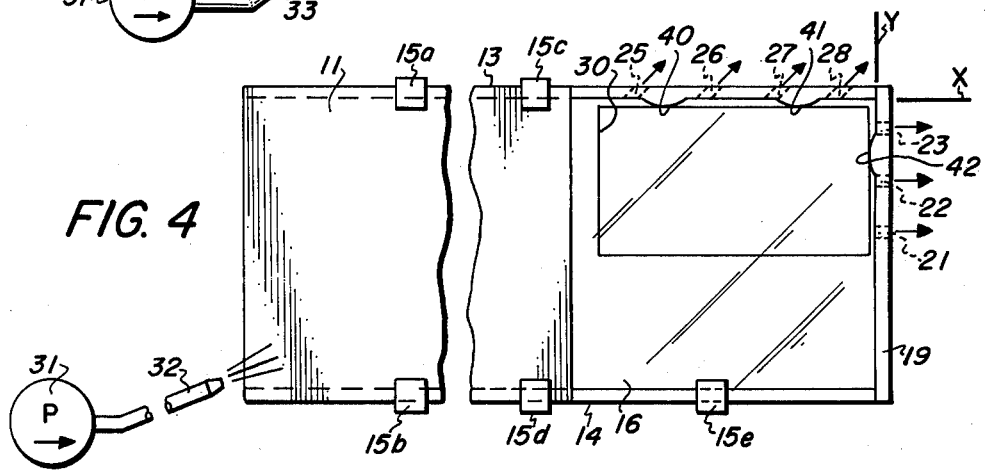
FIG. 4 is a partial top plan view of still another embodiment of registration apparatus, according to the invention, a sheet being shown therein in a registered position.

Referring to FIGS. 1 and 4, it may be seen that the registration apparatus shown in FIG. 4 differs from that shown in FIG. 1 only in that elongated member 13 includes projections 40 and 41 tangentially aligned with an X axis, and the stop member includes a projection 42 tangentially aligned with a Y axis. These projections minimize the need for precise orthogonal alignment between the stop 19 and the elongated member 13 required to register a rectangular sheet. Alternatively, the projections improve registration when minor irregularities are present in sheets supplied for registration.

Figure 6:
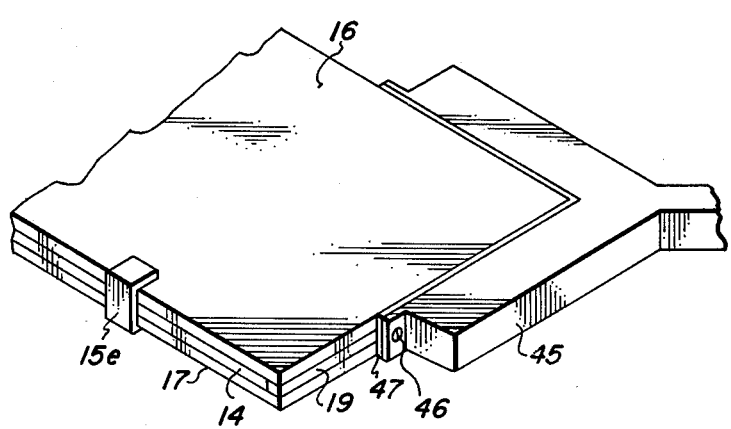
FIG. 6 is a partial perspective view of the registration apparatus shown in FIG. 5.

Referring to FIGS. 1, 5, and 6, it may be seen that the registration apparatus disclosed in FIGS. 5 and 6 differs from that shown in FIG. 1 in that a manifold 45 is fastened with screws 46 to the elongated member 13 and stop 19. A gasket 47 is interposed between the manifold 45 and the sleeve to prevent fluid leakage. The ports 25–28 in the elongated member and ports 21–23 in the stop communicate with a chamber 48 in the manifold, and the chamber in the manifold communicates with a vacuum pump 49. With this arrangement, the flow of fluid through the sleeve may be accelerated to more rapidly register sheets inserted through the open end of the sleeve. In this embodiment, shrouds 53, 54, 63, and 64 may be dispensed with so long as the pressures provided by pumps 31 and 49 at the openings 51, 52, 61, and 62 create an inward flow of fluid. If desired, the shrouds 53, 54, 63, and 64, the pump 31, and the nozzle 32 may be dispensed with, and the sheet may be registered with the vacuum pump 49. Thus, it may be seen that sheet 30 may be registered with a pressure pump, with a vacuum pump, or with both.

Referring to FIGS. 5 and 7, it may be seen that FIG. 7 shows apparatus which differs from that which is shown in FIG. 5 only in that the pumps 31 and 49 have been replaced with a reversible pump 50 coupled to the nozzle 32 and manifold 45. The reversible pump may be used to rapidly move a sheet inserted into the sleeve into registration and to rapidly move a registered sheet out through the open end of the sleeve, it being assumed that the direction of rotation of the rollers is reversed when the pump is reversed. In this connection, it should be appreciated that the term reversible pump may include apparatus having a valve arrangement which may be operated manually or automatically.

It is to be understood that the description herein of preferred embodiments, according to the invention, have been set forth as examples thereof and are not to be construed or interpreted as limitations on the claims which follow and define the invention.

What is claimed is:

1. Apparatus for transporting a sheet through at least one curved path and for registering the sheet with respect to perpendicularly related axes, the sheet having a length and width within predetermined ranges, comprising:
   a. a sleeve for internally accomodating said sheet, said sleeve extending along the curved path, at least one point on an inner narrow wall of the sleeve being aligned in parallel with one of the axes;
   b. a stop located at one end of the sleeve, the stop having at least one point aligned in parallel with the other of the axes;
   c. means for guiding the sheet past corners of said at least one curved path; and
   d. means for providing in the sleeve a fluid stream having velocity components normal to each of the axes, whereby when a sheet is placed in the sleeve the stream moves the sheet into said means (c) and into abutment with each of said points;
   said means for guiding including a first opening at a corner of a curved path in the top wide wall of the sleeve, a second opening, located opposite the first opening on the bottom wide wall of the sleeve, a first rotatably mounted roller extending into the sleeve through one of the openings, a second rotatably mounted roller extending into the other opening of the sleeve and engaging the first roller to provide a nip, and means for driving one of the rollers.

2. Apparatus as defined in claim 1 wherein said roller is covered by a shroud coupled to the sleeve in a fluid tight manner and said second roller is covered by another shroud coupled to the sleeve in a fluid tight manner.

3. Apparatus as defined in claim 2 wherein said means for providing a fluid includes a fluid source for injecting fluid into the sleeve.

4. Apparatus as defined in claim 3 wherein said means for providing a fluid includes a manifold coupled to at least one of the ports and a pump for discharging fluid from the manifold.

5. Apparatus as defined in claim 4 wherein said fluid source includes apparatus for directing fluid under pressure, and said apparatus is coupled to said pump.

6. Apparatus as defined in claim 5 wherein said pump is reversible.

7. Apparatus as defined in claim 1 wherein said means for providing a fluid stream includes at least one port in said stop and at least one port in said narrow wall.

8. Apparatus as defined in claim 7 wherein said means for providing a fluid includes a fluid source injecting fluid into the sleeve at the other end.

9. Apparatus as defined in claim 8 wherein said means for providing a fluid includes a manifold coupled to at least one of the ports and a pump for discharging fluid from the manifold.

10. Apparatus as defined in claim 7 wherein said means for providing a fluid stream includes a manifold coupled to said ports and a vacuum pump coupled to the manifold.

11. Apparatus as defined in claim 1 wherein said sleeve includes a top plate and a bottom plate, at least one of said plates being translucent.

12. Apparatus as defined in claim 11 wherein said means for providing a fluid stream includes at least one port in said stop and at least one port in said narrow wall.

13. Apparatus as defined in claim 12 wherein said means for providing a fluid includes a fluid source for injecting fluid into the sleeve at its other end.

14. Apparatus as defined in claim 12 wherein said means for providing a fluid includes a manifold coupled to at least one of the ports and a pump for discharging fluid from the manifold.

* * * * *